US011155228B2

(12) United States Patent
Komarizadeh

(10) Patent No.: US 11,155,228 B2
(45) Date of Patent: Oct. 26, 2021

(54) VEHICLE SAFETY DEVICE

(71) Applicant: Seyed Omid Komarizadeh, Mission Viejo, CA (US)

(72) Inventor: Seyed Omid Komarizadeh, Mission Viejo, CA (US)

(*) Notice: Subject to any disclaimer, the term of this patent is extended or adjusted under 35 U.S.C. 154(b) by 0 days.

(21) Appl. No.: 16/660,809

(22) Filed: Oct. 23, 2019

(65) Prior Publication Data
US 2021/0122315 A1 Apr. 29, 2021

(51) Int. Cl.
*B60R 21/02* (2006.01)
*B60R 21/055* (2006.01)
*B60R 21/0132* (2006.01)
*B60R 21/01* (2006.01)

(52) U.S. Cl.
CPC ...... *B60R 21/0286* (2013.01); *B60R 21/0132* (2013.01); *B60R 21/055* (2013.01); *B60R 2021/01286* (2013.01); *B60R 2021/0293* (2013.01)

(58) Field of Classification Search
CPC . B60R 21/0286; B60R 21/032; B60R 21/055; B60R 21/0428; B60R 2021/0293; B60R 2021/022; B60R 2021/0273; B60R 2021/01286
USPC ........................................ 280/748, 751, 753
See application file for complete search history.

(56) References Cited

U.S. PATENT DOCUMENTS

| | | | | | |
|---|---|---|---|---|---|
| 3,759,343 | A | * | 9/1973 | Monaghan | B60R 21/02 280/753 |
| 3,837,670 | A | * | 9/1974 | Hilyard | B60R 21/02 280/753 |
| 4,023,643 | A | * | 5/1977 | Bagley, Jr. | B60R 21/02 280/753 |
| 5,068,793 | A | * | 11/1991 | Condne | B60R 21/16 701/46 |
| 6,846,015 | B2 | * | 1/2005 | Meduvsky | B60R 21/02 188/188 |
| 6,863,307 | B2 | * | 3/2005 | Kim | B60R 21/05 280/750 |
| 7,264,271 | B2 | * | 9/2007 | Barvosa-Carter | B60R 21/04 280/751 |
| 8,346,438 | B2 | * | 1/2013 | Breed | B60R 21/214 701/45 |
| 8,346,439 | B2 | * | 1/2013 | Andres | B60R 21/0133 701/45 |
| 8,820,830 | B2 | * | 9/2014 | Lich | B60N 2/986 297/216.13 |
| 2012/0007408 | A1 | * | 1/2012 | Freienstein | B60N 2/4235 297/464 |
| 2014/0232151 | A1 | * | 8/2014 | Wilmot | B60N 2/4279 297/216.1 |

(Continued)

*Primary Examiner* — Paul N Dickson
*Assistant Examiner* — Caitlin Anne Miller
(74) *Attorney, Agent, or Firm* — Shalchi Burch LLP; Ali Shalchi, Esq.

(57) ABSTRACT

A vehicle safety device has a connective rod having a proximal end and a distal end, the solenoid assembly connected with the distal end of the connective rod, and the solenoid assembly comprising a solenoid. The vehicle safety device includes a reinforced pad comprising a rigid support plate and a pad portion, the reinforced pad connected with the solenoid assembly. The vehicle safety device further includes an activation assembly comprising a relay device configured to transmit an activation signal to the solenoid.

11 Claims, 14 Drawing Sheets

(56) References Cited

U.S. PATENT DOCUMENTS

2019/0375361 A1\* 12/2019 Markusic .............. B60R 21/055

\* cited by examiner

SECTION B - B

900

| Location | Without Protection | With Protection | Difference in Result |
|---|---|---|---|
| Head Acceleration (g) | 55.3 | 36 | 19.3 |
| Lower spine Acceleration (g) | 15.5 | 10.4 | 5.1 |
| Upper spine Acceleration (g) | 14.3 | 12.8 | 1.5 |
| Pelvis Acceleration (g) | 9.8 | 11.6 | 1.8 |
| Abdomen Rib-01 Displacement (mm) | 3.6 | 4.4 | 0.8 |
| Thorax Rib-01 Displacement (mm) | 9.5 | 6.4 | 3.1 |
| Thorax Rib-02 Displacement (mm) | 4 | 2.5 | 1.5 |
| Shoulder Rib Displacement (mm) | 15 | 16 | 1 |
| Abdomen Rib-02 Displacement (mm) | 3 | 3.6 | 0.6 |

FIG. 9

VEHICLE SAFETY DEVICE

FIELD OF THE INVENTION

The present invention is in the field of vehicle safety devices and systems.

BACKGROUND

Although modern advances in automotive safety features such as bumpers, seatbelts and airbags have provided additional protection for drivers and passengers from front and rear collisions, side impact collisions currently leave occupants relatively unprotected. Some automobiles offer side and curtain airbags, but most vehicles do not offer sufficient protection from side impact collisions aside from the car door. With only about 10-12 inches between an occupant's body and the outer surface of the vehicle door, there is minimal structure to absorb the energy of a collision, which can result in serious upper extremity injuries from door intrusion or direct impact with a colliding vehicle (bullet vehicle). A common injury resulting from side and/or oblique impacts are shoulder injuries even where a standard side airbag is deployed. Injuries can also occur during minor side collisions that occur at speeds below the threshold for airbag deployment. Direct trauma to the shoulder region could cause a variety of shoulder injuries such as rotator cuff tears, SLAP lesions and AC joint dislocations.

SUMMARY

Described herein are devices, systems, and methods for providing additional upper extremity protection for vehicle occupants during collisions.

An implementation relates to a vehicle safety device, comprising a connective rod having a proximal end and a distal end, the proximal end configured to be fixed to the side of a vehicle seat; a solenoid assembly connected with the distal end of the connective rod, the solenoid assembly comprising a solenoid; a reinforced pad comprising a rigid support plate and a pad portion, the reinforced pad connected with the solenoid assembly, wherein the reinforced pad is configured to rotate about the connective rod; and an activation assembly comprising a signal conduit, relay device, and solenoid wiring, wherein the relay device is configured to transmit an activation signal to the solenoid via the solenoid wiring, and wherein the signal conduit is in electrical communication with an electronic control unit (ECU).

In one example, the solenoid assembly further comprises a hollow connective tube, a small bearing, a solenoid casing, and a large bearing, wherein the connective rod extends through the hollow connective tube, small bearing and solenoid casing to connect to the solenoid, and wherein the small bearing is connected with a proximal end of the solenoid and the larger bearing is connected with a distal end of the solenoid.

In another example, the small bearing is connected with a proximal end of the solenoid and the large bearing is connected with a distal end of the solenoid.

In another example, the relay device transmits the activation signal when the relay device receives a signal corresponding to a lateral acceleration of at least about 4 g.

In another example, the reinforced pad is configured to rotate from an undeployed position to a deployed position once the solenoid receives the activation signal.

In another example, the reinforced pad rotates up to 95 degrees from the undeployed position to the deployed position.

In another example, the reinforced pad rotates at a speed in the range of about 14 to 19 meters per second.

In another example, the reinforced pad rotates to the deployed position about 15 to 20 milliseconds after the relay device transmits the activation signal.

Another implementation relates to a vehicle safety device, comprising a connective rod having a proximal end and a distal end; a solenoid assembly connected with the distal end of the connective rod, the solenoid assembly comprising a solenoid; a reinforced pad comprising a rigid support plate and a pad portion, the reinforced pad connected with the solenoid assembly; and an activation assembly comprising a relay device, wherein the relay device is configured to transmit an activation signal to the solenoid.

In one example, the relay device is in electrical communication with an airbag control module.

In another example, the relay device is in electrical communication with one or more accelerometers or motion sensors.

In another example, the relay device transmits the activation signal when the relay device receives a signal corresponding to a lateral acceleration of at least about 4 g.

In another example, the reinforced pad is configured to rotate from an undeployed position to a deployed position once the solenoid receives the activation signal.

In another example, the reinforced pad rotates up to 95 degrees from the undeployed position to the deployed position.

In another example, the reinforced pad rotates at a speed in the range of about 14 to 19 meters per second.

In another example, the reinforced pad rotates to the deployed position about 15 to 20 milliseconds after the relay device transmits the activation signal.

Another implementation relates to a vehicle safety device comprising a connective rod having a proximal end and a distal end; a solenoid assembly connected with the distal end of the connective rod, the solenoid assembly comprising a solenoid; a reinforced pad comprising a rigid support plate and a pad portion, the reinforced pad connected with the solenoid assembly, wherein the reinforced pad is configured to rotate about the connective rod; and an activation assembly comprising one or more sensors that are in electrical communication with the solenoid assembly and configured to transmit an activation signal to the solenoid.

In one example, the one or more sensors comprise accelerometers or motion sensors.

In another example, the activation signal is transmitted when the one or more sensors detect a lateral acceleration at or above a threshold level.

In another example, the threshold level is 4 g.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The details of one or more implementations are set forth in the accompanying drawings and the description below.

Other features, aspects, and advantages will become apparent from the description, the drawings, and the claims, in which:

FIG. 9 depicts a summary of test data from an example of the vehicle safety device in accordance with the present invention.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

In the following discussion, numerous specific details are set forth to provide a thorough understanding of the present invention. However, those skilled in the art will appreciate that the present invention may be practiced without such specific details. In other instances, well-known elements, processes or techniques have been briefly mentioned and not elaborated on in order not to obscure the present invention in unnecessary detail and description. Moreover, specific details and the like may have been omitted inasmuch as such details are not deemed necessary to obtain a complete understanding of the invention, and are considered to be within the understanding of persons having ordinary skill in the relevant art.

Figure 1:
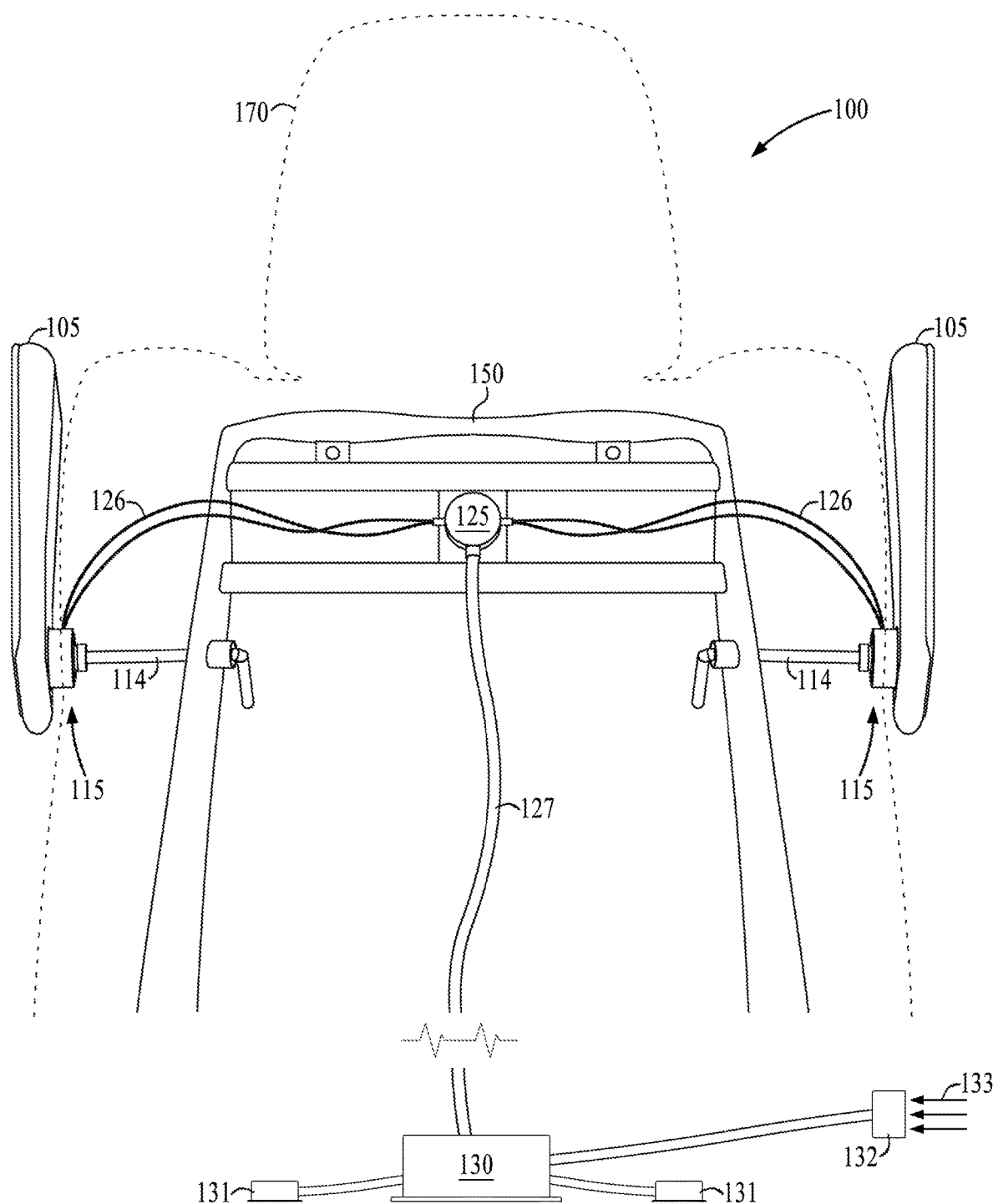
FIG. 1 depicts a front view of an exemplary vehicle safety device in accordance with the present invention.

Referring to FIG. 1 of the drawings, which depicts a front view, a vehicle safety device 100 according to an exemplary embodiment of the present invention is structurally integrated with sides of a seat frame 150 of a vehicle seat 170 (depicted by dashed lines) via a connective rod 114. The vehicle seat 170 provides a strong, stable anchoring point for the device 100, and can house components such as electrical wirings that can be electrically and/or physically connected with the vehicle safety device 100. The connective rod 114 has a proximal end and a distal end. The proximal end of the connective rod 114 can be fixed to the seat frame 150 via welding, locking mechanisms, or other conventional means. It should be noted that the vehicle safety device 100 can be installed on any seat in a vehicle as appropriate, and on multiple seats in a vehicle. For ease of reference, the following description will refer to a driver's side installation in a vehicle. The vehicle safety device 100 further comprises a solenoid assembly 115 that connects with the distal end of the connective rod 114, and a reinforced pad 105 that connects with the solenoid assembly 115. The vehicle seat 170 can serve as a housing area for the structural and/or electrical components of the vehicle safety device 100, with the exception of the reinforced pad 105 which is positioned outside of the vehicle seat. Using the vehicle seat in this way allows the present system to integrate seamlessly into the vehicle and its various systems of electronics and sensor components.

In one example, the vehicle safety device 100 is operatively integrated with an airbag control module (ACM) 130 which can, in turn, be connected with one or more accelerometers 131 located throughout the vehicle via wired or wireless electronic connections. The vehicle safety device 100 is designed for low-speed impacts at a lower threshold of acceleration than required for conventional airbag deployment. Thus, the vehicle safety device 100 may be activated (or deployed) in lower impact collisions that would not trigger the higher acceleration threshold of vehicle airbags, or alternatively, may be deployed alongside vehicle airbags in higher impact collisions. As used herein, the terms "activate" and "deploy" may be used interchangeably with respect to the operation of the vehicle safety device 100. In one example, sufficient positive/negative lateral or angular accelerations, especially those occurring during side-impact collisions, provide the main source of sensor feedback that activates (or deploys) the device 100. Additionally, the vehicle's lateral motion sensors 132 can provide sensor data to one or more of the vehicle's electronic control units, e.g. ECU 30. In one example, the ECU 30 is an airbag control module (ACM). However, the ECU may comprise other control modules. Side motion arrows 133 represent the lateral driver's side motion that is sensed to initiate deployment of the device 100. In a preferred embodiment, the accelerometers 131 and lateral motion sensors 132 serve as the principal sensor modules for activating the system—which will respond to whichever is triggered first. For purposes of the present disclosure, the accelerometers 131 and lateral motion sensors 132 are examples of "sensors" although other types of sensors may be utilized to generate an activation signal.

The schematic representation of these sensor/computer system components serves primarily to show an example of basic connectivity from the sensors 131/132 to ECU 30 to vehicle safety device 100. Although a typical location for these components can be beneath the vehicle seat 170, other regions of the vehicle can be used to house one or more of these components. Typically, other accelerometers can be mounted on the A-pillar and B-pillar of a vehicle. The ECU 30 records sensor data from connected accelerometers 131 and communicates an activation signal to a relay device 125 (e.g., an electrical current relay) via a signal conduit 127. This hardwired approach relays a signal/current directly to the relay device 125 (the relay device operates as a starter in some conventional applications), which outputs current directly to the solenoid assembly 115 via solenoid wiring 126, causing rotational activity within the solenoid assembly that is directly transferred to the connected reinforced pad 105. The signal conduit 127, the relay device 125, and solenoid wiring 126 may be collectively referred to as the "activation assembly." In another embodiment of the present invention, a wireless approach can be utilized to transmit an activation signal from the ECU 30, whereby a connected/powered wireless receiver accepts the ECU data signal, then powers a starter thereafter, or possesses dual (signal/starter) capabilities. This approach may be more appropriate when the vehicle's ECU 30 is found in locations other than the region beneath the seat 170. In one embodiment, at the time of positive or negative acceleration, full deployment of the pads 105 occurs within a time range of about 15-20 milliseconds.

In another embodiment, the vehicle safety device 100 may comprise its own dedicated/integrated safety sensors, such as one or more accelerometers and/or motion sensors, that are configured to communicate with the solenoid assembly through wireless or wired signal transmission means as known in the art. In another embodiment, the activation assembly may utilize wireless signals such that solenoid wiring 126 and signal conduit 127 would not be necessary. Rather, in this example, the relay device 125 would receive a wireless signal from the ACM and/or ECU 130 (or directly from dedicated safety sensors such as accelerometers or motion sensors) and in turn, wirelessly transmits an activation signal to a receiver on the solenoid assembly 115.

Figure 2:
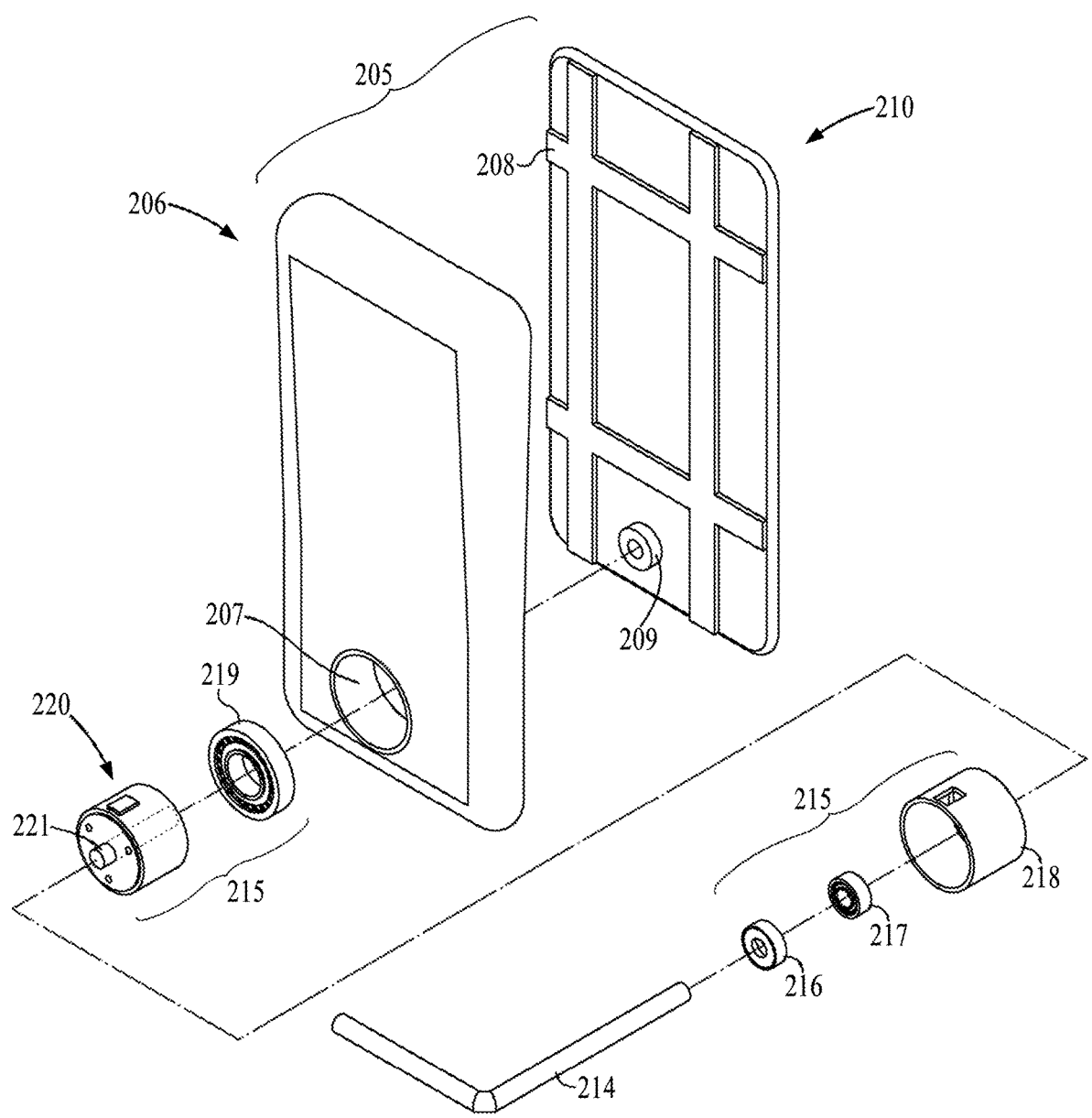
FIG. 2 depicts an exploded perspective view of an exemplary vehicle safety device in accordance with the present invention.

Referring now to FIG. 2 of the drawings, an exploded view (shown in perspective) depicts components and assemblies of the vehicle safety device according to an exemplary embodiment of the present invention. The two main assemblies include the aforementioned reinforced pad 205 and solenoid assembly 215. The reinforced pad 205 further comprises a pad portion 206 and a rigid support plate (or frame) 210. The pad portion 206 includes a tubular cavity 207 running through its lower region, forming openings on the front and back of the pad portion. The line of explosion intersects these openings centrally. The rigid support plate 210 includes a frame 208 and a connective slot 209. The intersecting pattern of tracks that form the frame 208 runs substantially along the entire length and width of the mated surface of the plate 210, that is the plate-facing surface (substantially flat surface) of the pad portion 206 in a completed assembly of the reinforced pad 205. The frame 208 extends away from this mated surface, in a direction perpendicular to it, with a substantially uniform thickness that creates a high level of rigidity in the plate 210, promoting the structural integrity of the reinforced pad 205. The connective slot 209 is a tubular protrusion that extends away from the mated surface of the plate 210 in a similar manner, with an equal or greater uniform thickness than that of the frame 208, and with an opening that faces the flat back surface of the pad portion 206. It has a circumferential inner surface and a circumferential outer surface, both of which make contact with elements of the solenoid assembly 215. In the fully assembled reinforced pad 205, the slot 209 lies fully within the cavity 207, protruding centrally through its back opening. The solenoid assembly 215 further comprises a large bearing 219, a rotary solenoid 220, a solenoid casing 218, a small bearing 217, and a connective tube 216. A conventional process of frictional interference fitting, specifically press-fitting, is the preferred method of mating together these components of the solenoid assembly 215. Conventional press-fitting allowances, falling within a range of between about 2 to 5 mm, are utilized where necessary to accommodate rotation between certain parts of the assembly 215. The connective rod 214, with long and short portions, and an approximate diameter of about 7 mm, inserts into the connective tube 216 such that its long portion passes through the central front opening of the tube and terminates within it. An outer circumferential surface of the rod 214 is press-fit against an inner circumferential surface of this central front opening—which also has an approximate diameter of about 7 mm. A second larger inner circumferential surface of the connective tube 216, with an approximate diameter of about 19 mm, is mated with the small bearing 217 such that the entire bearing (also with an approximate diameter of 19 mm) is substantially inserted through the central back opening of the tube 216.

The rotary solenoid 220 serves as the primary actuator for pad 205 deployment; it is triggered by an electrical current that generates a magnetic field. This field creates mechanical energy, via energy conversion structures and methods known in the art. The solenoid 220 further comprises a casing 218 and a central shaft 221 sharing a central axis with the solenoid (the lines of projection flanking the solenoid coincide with its central axis). The shaft 221 has an approximate diameter of 7 mm. An inner circumferential surface of the small bearing (corresponding to its inner race) with an approximate bore diameter of 7 mm, is press-fit against a circumferential exterior surface of the central shaft 221 of solenoid 220—that protruding portion of the shaft that is visible in the current figure. The aforementioned mechanical energy, in the form of a radial load, is applied by the solenoid 220 to its shaft 221, thereby spinning it about the aforementioned central axis. A hidden portion of the shaft 221 is denoted by dashed lines, as it lies within the solenoid 220 or protrudes out from the opposing side of the solenoid—the back side opposite the side visible in the current figure. That protruding portion of the shaft 221 (still considering the hidden portion) is mated with the connective slot 209 of the rigid support plate 210 through a circumferential inner surface of the slot, where a circumferential outer surface of the solenoid's shaft 221 makes contact with it. A substantial portion of the shaft 221 length is inserted into the slot 209, and is mated via press-fitting for example. The approximate diameter of this opening of the slot 209 is about 7 mm. Thus, rotational activity originating from the solenoid 220 and shaft 221 is directly transferred to the rigid support plate 210 and its attached pad portion 206. The large bearing 219 is mated with the connective slot 209 so that its circumferential inner surface (or inner race, with bore diameter) makes contact with a circumferential outer surface of the slot, both mated regions having diameters of approximately 15 mm. It serves as a regulator for the radial load being transferred from solenoid 220 to support plate 210, reducing friction during rotation and precisely optimizing the movement and speed of the present system via methods known in the art. The full diameter, corresponding to the outer race, of the large bearing 219 is approximately 32 mm. It is fully inserted via press-fit into the solenoid casing 218—a circumferential portion of which extends perpendicularly away from the back side of the solenoid 220 in order to accommodate the large bearing 219 as described.

Figure 3A:
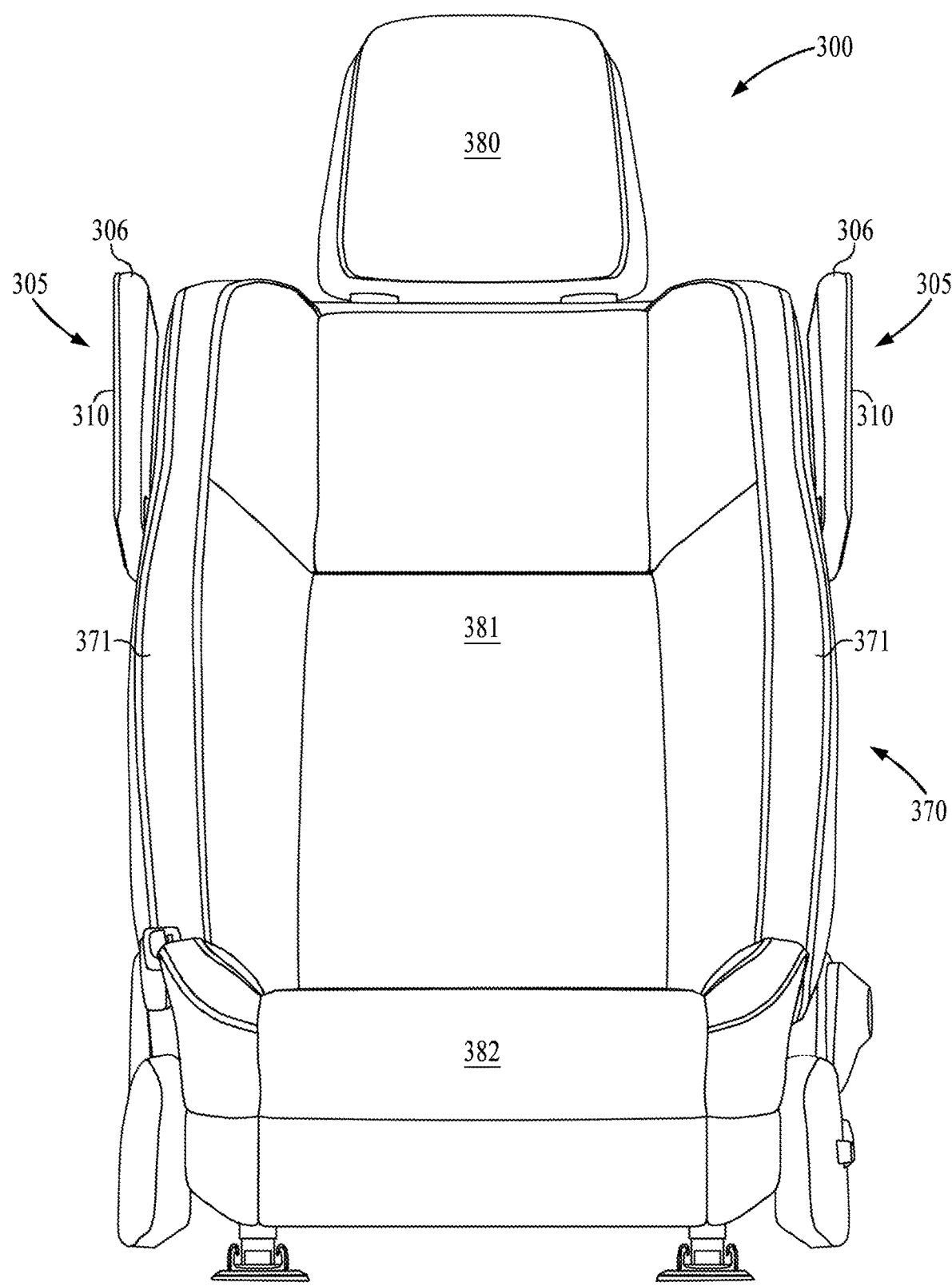
FIG. 3A depicts a front view of an exemplary vehicle safety device installed on a vehicle seat in accordance with the present invention.

FIG. 3A of the drawings depicts a front view of an exemplary vehicle safety device installed on a vehicle seat in accordance with the present invention. Labeled portions of the standard vehicle seat 370 are helpful in providing a context for describing various component locations and placements with regard to the vehicle safety device 300, and do not necessarily target claimed matter. By way of example, the vehicle seat 370 further comprises a headrest 380, a seat back 381, a seat cushion 382, and lateral portions 371. The headrest 380 is attached through a top surface of the seat back 381, which extends downward to meet a top surface of the seat cushion 382, and extends laterally to meet both lateral portions 371 of the seat 370. Each lateral portion 371 corresponds with a reinforced pad 305—each further comprising a rigid support plate 310 and pad portion 306. Each of the reinforced pads 305—shown here in an undeployed configuration, extends perpendicularly away from a corresponding lateral portion 371 at a distance nearly equal to its thickness. In order to reduce friction during deployment, the reinforced pad 305 may be installed so that a minimal amount of space is reserved between the exterior surface of the lateral portion 371 and a surface of the pad portion 306—that surface facing the lateral portion. If, for example, the unique contours of a seat, or structural aspects of the inner frame (see seat frame 150 of FIG. 1) do not allow for this space, surfaces of the pad portion 306 and lateral portion 371 can make minimal contact such that some pressure is applied to the lateral portion, without creating any appreciable hindrance in the deployment action of the vehicle safety device 300 caused by the frictional contact. Furthermore, the device 300 is preferably installed onto the lateral portions 371 at a height that preserves the functional, ergonomic, and aesthetic qualities of the vehicle seat 370. An exemplary installation places the reinforced pad 305 so that its top surface is nearly level with that of the lateral portion 371, while generally lower than the headrest 380. This serves to substantially minimize the profile of the device 300, so as not to be an impediment to the driver's field of view. Thus, it is largely a lateral extension of the seat.

Figure 3B:
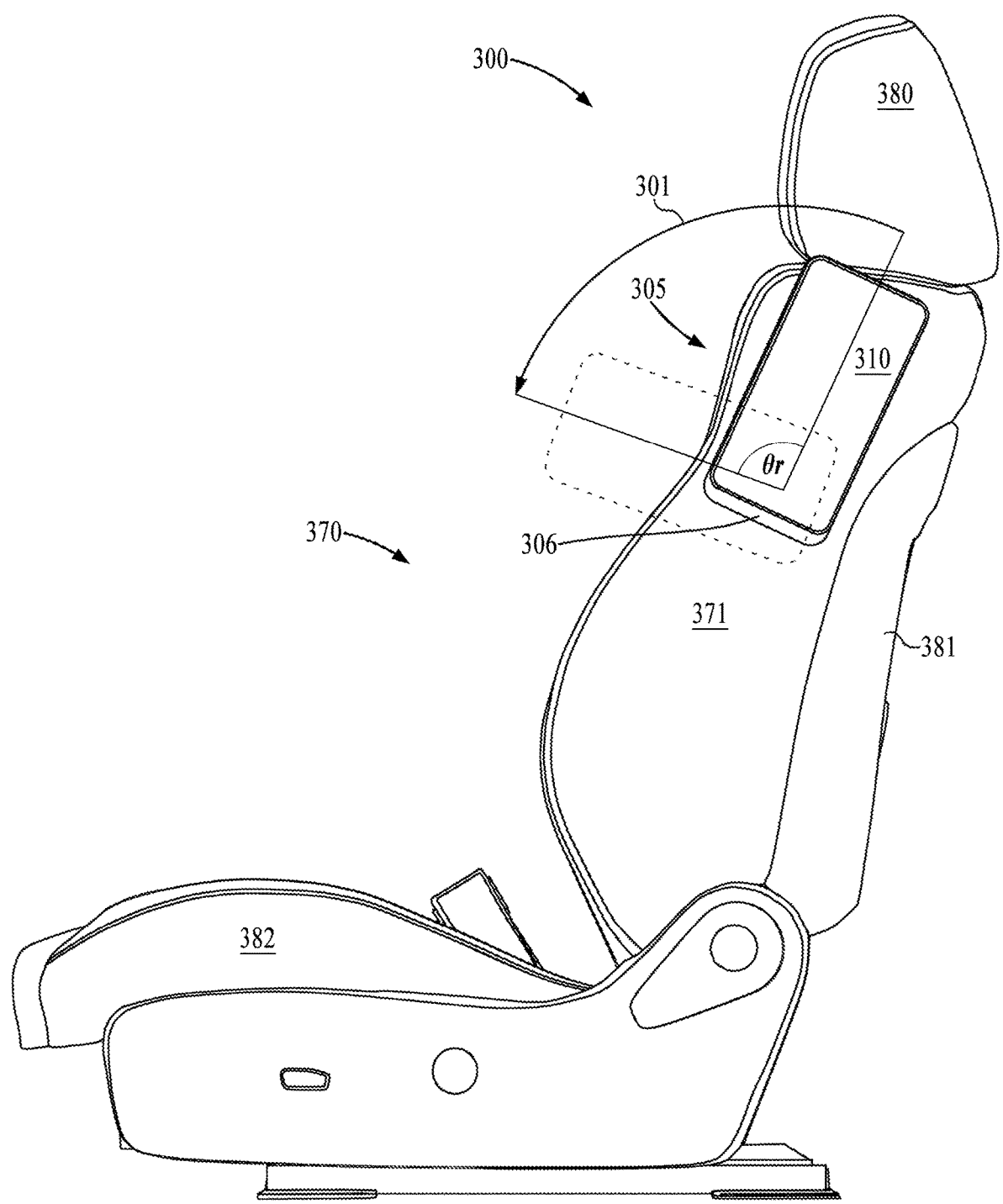
FIG. 3B depicts a side view of an exemplary vehicle safety device installed on a vehicle seat in accordance with the present invention.

FIG. 3B illustrates an example of a vehicle safety device installed on a vehicle seat in accordance with the present invention. The vehicle seat 370 comprising headrest 380, seat back 381, lateral portion 371, and seat cushion 382, is shown in a minimally reclined position that does not affect the position or deployment activity of the vehicle safety device 300. Moreover, movements of both the device 300 and seat 370, whether user-initiated or automatic, are mutually independent. The reinforced pad 305, with rigid support plate 310 and pad portion 306, is installed in a manner that accommodates its ideal range of rotational motion—denoted by motion arrow 301. The rectangular reinforced pad 305 is installed so that its length dimension runs nearly parallel to that of the seat back 381. Both its length and width portions lie substantially or completely within the profile contour of the lateral portion 371 of the seat 370, making it unobtrusive to an occupant(s). Motion arrow 301 depicts a range of forward/downward rotational movement from an undeployed to a deployed position; this range is denoted by angle θr. The rays of this angle run parallel to and near the central (horizontal) length axis of the reinforced pad 305. They meet at a vertex located in the lower region of the reinforced pad 305. This vertex lies approximately at the center point of the connective slot (see connective slot 209 of FIG. 2, noting that the line of explosion intersects its center). The final position of the deployed reinforced pad 305 is shown with dashed lines, indicating the contour of the pad. In the exemplary embodiment depicted, the optimal range of rotation, shown by angle θr, is approximately 95 degrees.

Figure 4A:
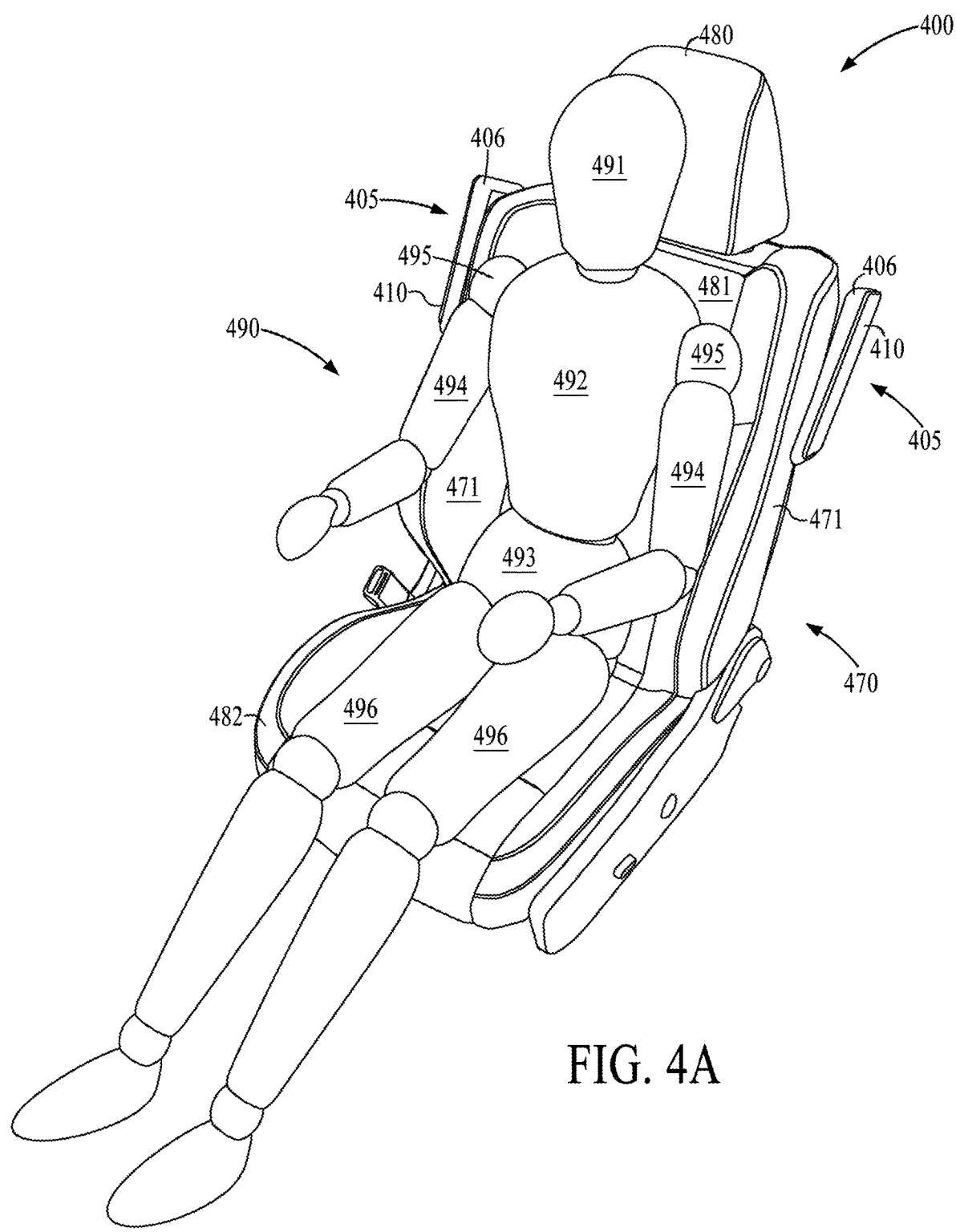
FIG. 4A depicts a perspective view of an exemplary vehicle safety device installed on a vehicle seat in an undeployed configuration in accordance with the present invention.

Referring now to FIG. 4A of the drawings, a perspective view of an exemplary vehicle safety device shows an installation on a vehicle seat, with a seated occupant present in the context of an undeployed configuration in accordance with the present invention. A fully installed vehicle safety device 400 is a dual pad system with one reinforced pad 405 attached per upper region of each lateral portion 471 of a vehicle seat 470. Each reinforced pad 405 further comprises a rigid support plate 410 and pad portion 406. Flanked by the reinforced pads 405, an occupant 490 is shown seated upon the seat cushion 482 of the vehicle seat 470, with legs 496 making contact with the seat cushion, pelvic region 493 on or near the cushion and seat back 481, thoracic region 492 making contact with the seat back, head 491 resting upon or situated near the headrest 480, and shoulders 495 and arms 494 situated near the meeting between seat back and lateral portions 471. The shoulders 495 of an average seated occupant 490 are situated at a height that is very close to the height of the reinforced pads 405—approximately near their center with respect to their length dimension. As well, considering the lateral spaces between the average occupant's shoulders 495 and the pad portions 406 of the reinforced pads 405, there is ample distance provided by the lateral portions 471 of the vehicle seat 470, since the occupant lies substantially within the width of the seat back 481. The head 491 and eye line of the average occupant 490 rises well above an exemplary installation of the device 400, especially since it rises no higher, or negligibly higher, than the top surfaces of the lateral portions 471. Thus, the centrally situated occupant 490 is not affected by the vehicle safety device 400 while it rests in an undeployed configuration; there is almost no physical contact between the occupant and device, nor visual obstruction of vehicle windows or mirrors. A properly fastened occupant 490 will gain the most benefit from the device 400, as it is an augmentation of, rather than replacement for, a seat belt protection system. In this regard, it adds an entirely new aspect of protection at the sides of the occupant 490, one that is nonintrusive and addresses a significant weakness of past and current methods.

Figure 4B:
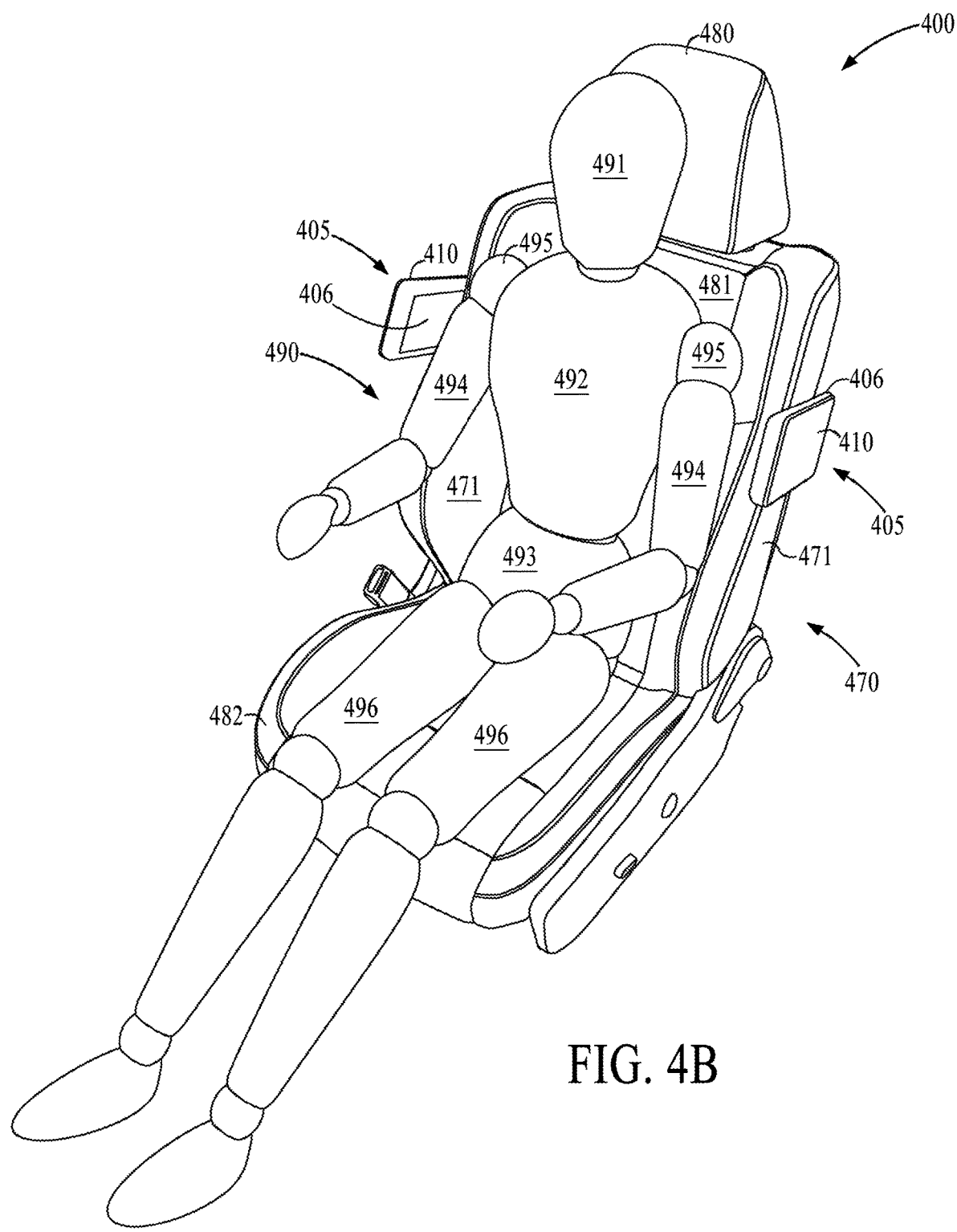
FIG. 4B depicts a perspective view of an exemplary vehicle safety device installed on a vehicle seat in a deployed configuration in accordance with the present invention.

FIG. 4B depicts a perspective view of an exemplary vehicle safety device installed on a vehicle seat in a deployed configuration in accordance with the present invention. The seated occupant 490 is shown in the context of the deployed configuration, and will be referred to as "occupant" or "driver" interchangeably in discussions pertaining to occupant kinematics and vehicular dynamics. In the following description, for ease of exposition, the terminology associated with Euler/Tait-Bryan angles, i.e. yaw, pitch, roll, will be applied when referring to vehicle rotation in three dimensions. Additionally, standard g-forces (or g) will provide the metric for describing accelerative forces experienced by an occupant 490 in response to vehicular collision forces, as well as those forces pertaining to these vehicular dynamics directly. As in the previous drawing, the occupant 490 further comprises head 491, thoracic region 492, shoulders 495, arms 494, pelvic region 493, and legs 496. They are centrally situated upon the vehicle seat 470 with headrest 480, seat back 481, lateral portions 471, and seat cushion 482. The vehicle safety device 400 is shown with its reinforced pads 405 fully rotated into a deployed configuration. The reinforced pads 405 have their rigid support plates 410 facing away from the occupant 490, and their pad portions 406 facing the shoulder 495 and upper arm 494 regions of the occupant.

For purposes of the following discussions, it should be assumed that the occupant 490 has properly fastened their safety belt. The previously mentioned positive or negative acceleration refers primarily to lateral changes with respect to the vehicle, as the main object of the present invention relates to improving occupant kinematics during side-impact collisions. This principally includes changes to angular velocity, or yaw, but also to roll and even pitch (albeit rarely) if necessary; all three-dimensional rotation may be considered in some embodiments. Additionally, considering the complex dynamics of vehicle collisions and the resulting occupant kinematics, it should be noted that positive/negative longitudinal acceleration might also trigger pad deployment in certain embodiments, since it can often be a precursor to the aforementioned lateral movements. An example would be an erratic steering response (following intense longitudinal acceleration) by the driver that sufficiently changes the angular velocity of the vehicle, followed by multiple other abnormal vehicular dynamics—such as those occurring during a multi-car collision or other impact (e.g. against fixed structures). In that scenario, the second (driver-initiated) action would likely initiate pad deployment, but it may be desired that the device respond even sooner. In one embodiment, anything above 4 g of acceleration (e.g., lateral acceleration), or change in velocity of at least 13 kph, activates the vehicle safety device 400. For purposes of reference herein, the "threshold level" or "activation threshold" of acceleration at or above which the activation signal will be transmitted to the solenoid to activate deployment of the vehicle safety device, i.e. the rotation of the reinforced pad from the undeployed position to the deployed position. Additionally, pad deployment occurs rotationally at a speed within a range of about 14 to 19 meters per second, and as previously mentioned, within a time range of about 15-20 milliseconds.

Continuing the discussion of occupant kinematics, the vehicle safety device 400 offers a plurality of net improvements in bodily g-forces and displacements. A primary benefit is protection of the shoulders 495 during oblique or side-impact collisions—which account for approximately 51% of car crashes, and can easily crush doors toward/into the occupant 490. In drivers, approximately 35% of injuries in the upper extremities involve the shoulders, with 46% of the same for passengers. This is largely due to the relatively thin layer of structural protection offered by a door, coupled with its extremely close proximity (e.g. a few inches) to the occupant 490. Moreover, occupant kinematics during side-impact collisions entails movement toward the door and colliding vehicle. Unlike side curtain airbags, the vehicle safety device 400 provides ample shoulder protection, by creating a soft buffer between the occupant 490 and vehicle door. As an example, in a lateral collision originating from the occupant's left side, the occupant 490 accelerates toward the left reinforced pad 405 until their left shoulder 495 and/or left arm 494 makes contact with its pad portion 406, bouncing off of it and resulting in occupant movement toward the right pad. In this way, not only is catastrophic shoulder injury averted, but momentum is also transferred in a manner that substantially dissipates it across several regions of both the occupant 490 and vehicle seat 470.

Figure 5:
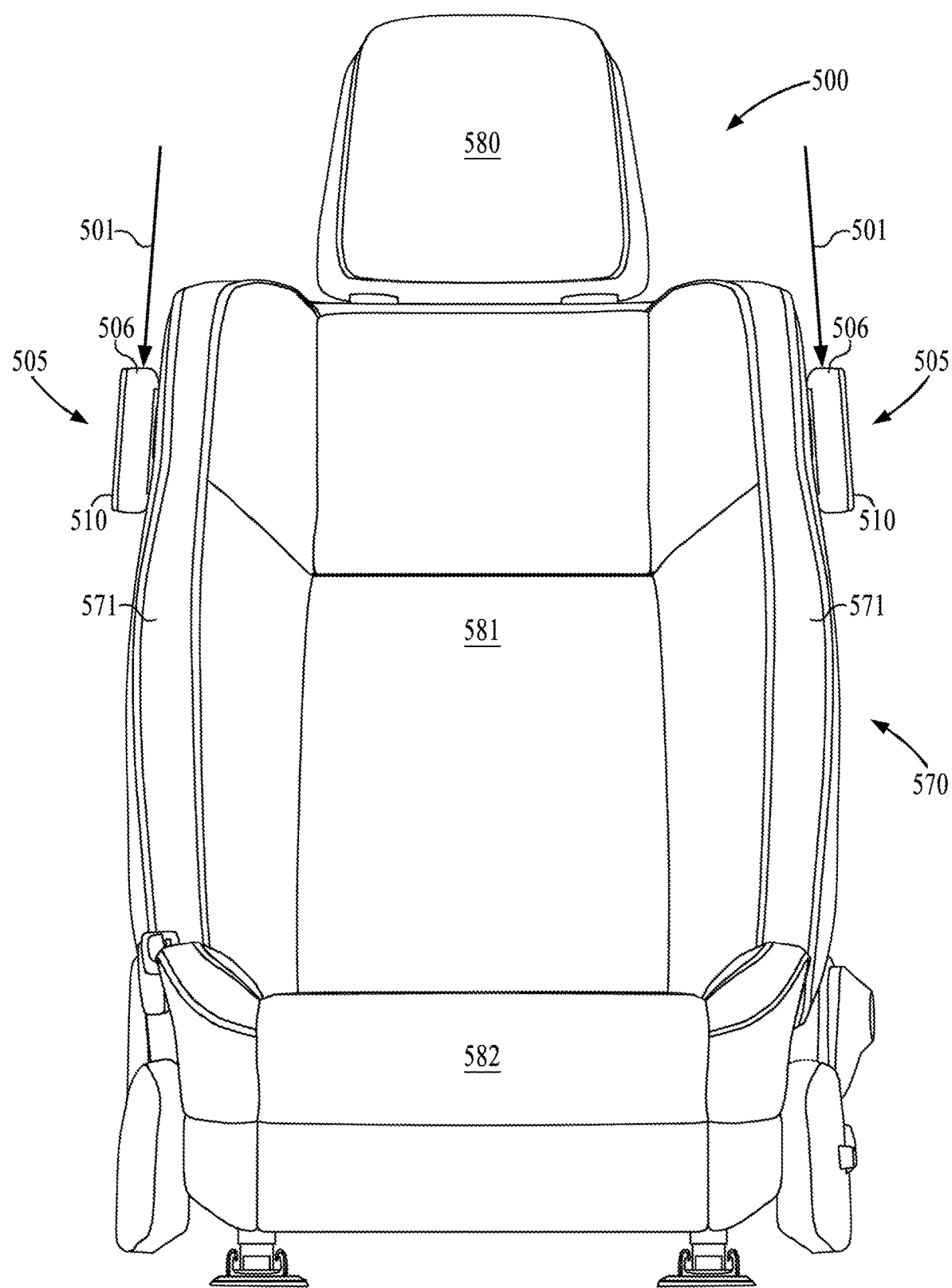
FIG. 5 depicts a front view of an exemplary vehicle safety device installed on a vehicle seat in a deployed configuration in accordance with the present invention.

FIG. 5 of the drawings depicts a front view of an exemplary vehicle safety device installed on a vehicle seat in a deployed configuration in accordance with the present invention. The reinforced pads 505, with rigid support plates 510 and pad portions 506 have moved directly downward in this view, as indicated by motion arrows 501. Depending on the contour variations of the vehicle seat 570, especially around its lateral portions 571, the vehicle safety device 500 can be minimally to substantially angled during installation to accommodate such features. In a deployed configuration, the reinforced pad 505 is rotated approximately 95 degrees forward/downward—away from the headrest 580, so that its width dimension is nearly parallel with a central vertical axis running through the seat back 581. Thus, and with reference to FIGS. 4A-4B, the reinforced pad 405/505 rotated from a substantially vertical position in the undeployed state to a substantially horizontal position in the undeployed state. Similarly, its length dimension runs nearly parallel to a horizontal axis running centrally through the seat cushion 582. The rotary solenoid (see solenoid 220 of FIG. 2) used in the present invention can be self-restoring via a return spring, thus providing automatic pad rotation in either direction. However, a preferred embodiment provides a user-resettable option, as real-world usage yields unpredictable vehicle dynamics and obvious impediments to an automated sensor or time-based resetting. The simple action of pushing the reinforced pad(s) 505 back upward into an undeployed position can re-lock the device, thus preparing/resetting it for another deployment.

Figure 6A:
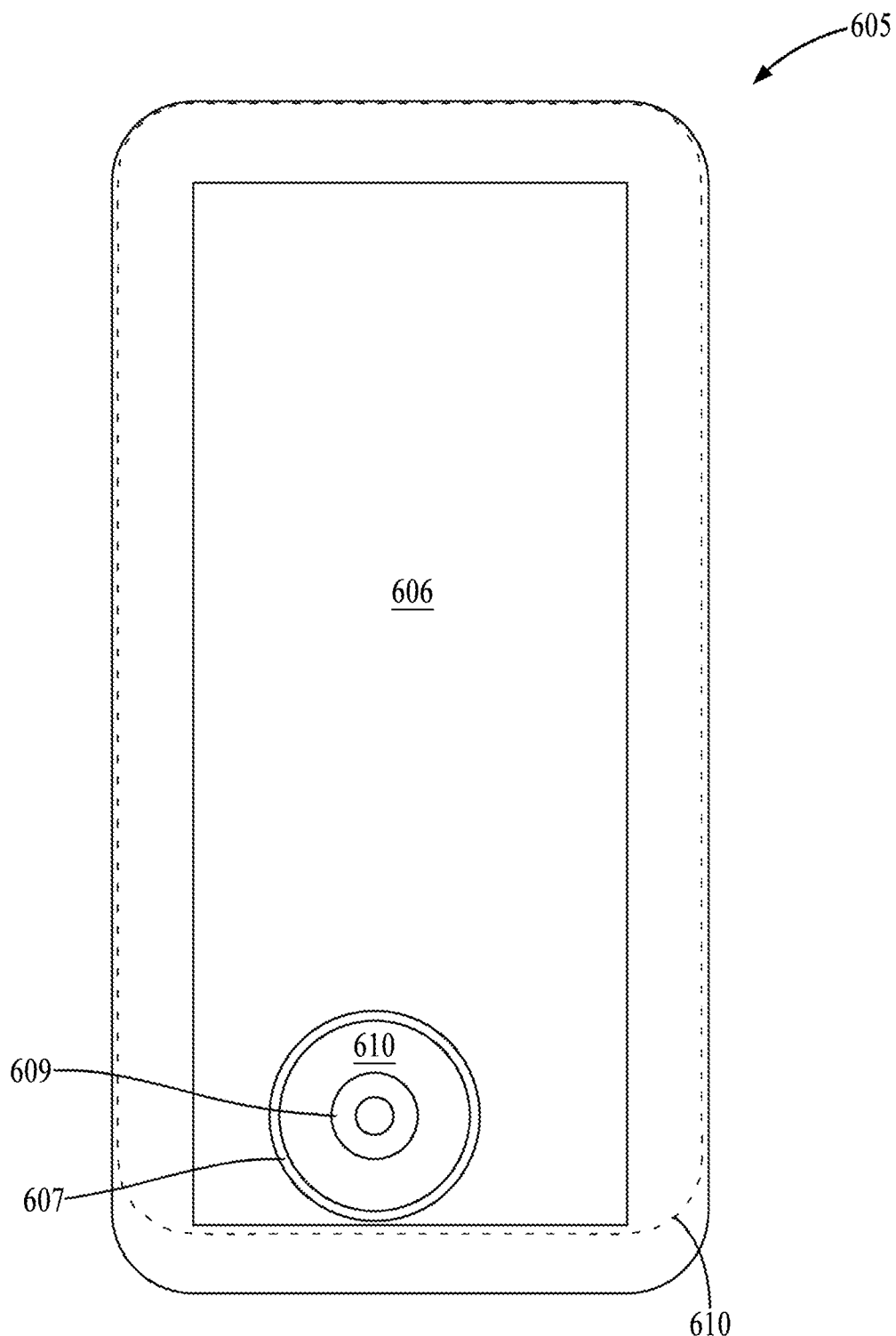
FIG. 6A depicts a front view of a reinforced pad of an exemplary vehicle safety device in accordance with the present invention.

Referring now to FIG. 6A of the drawings, a front view depicts a reinforced pad of an exemplary vehicle safety device in accordance with the present invention. The reinforced pad 605 has a substantially rectangular shape. Any edges and corners are generally rounded to a degree that promotes occupant comfort and safety during interactions with both deployed and undeployed configurations. Though this ergonomic feature is more closely associated with the pad portion 606, it is generally extended to the rigid support plate 610 (visible through the front opening of the pad's cavity 607, and shown with a dashed contour line denoting its hidden portion), not only for consistency in design, but also to further the goal of maximizing the safety and comfort of the occupant. The connective slot 609 of the rigid support plate 610 is visible through the front opening of the pad's cavity 607, and is located centrally with respect to the cavity. The dimensions of the reinforced pad 605 may vary, and can be determined, for example, based on the average occupant's height, proportions, shoulder size, etc. Similarly, the pad portion 606 or the entire reinforced pad can be provided in different sizes based on a unique user's needs. In one embodiment, the composition of the pad portion 606 is that of an automotive-grade, low-density form, specifically a low-resilience polyurethane form (akin to memory form), Sorbothane, or any high viscoelastic solid material that best augments the safety features of the present invention. In a similar embodiment, the pad portion 606 can be characterized by approximate material properties as follows: a density of about 1.01e-7 kg/mm3, a Young's modulus of about 0.00416 GPa, a tension cut-off stress of about 1e+020 GPa, a hysteresis unloading factor of about 0.01, a viscous coefficient of about 0.25, and a shape unloading factor of about 10.

Figure 6B:
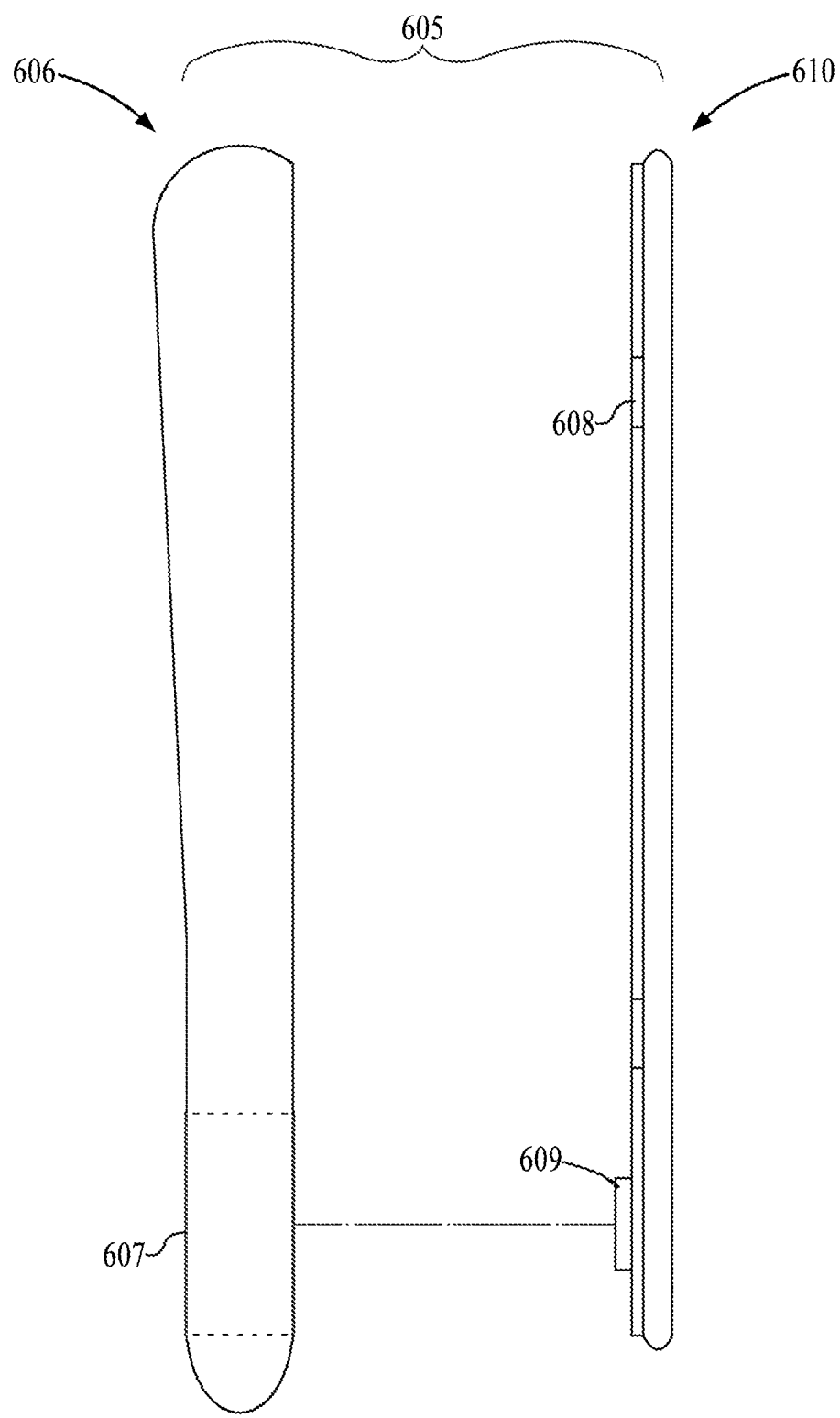
FIG. 6B depicts an exploded side view of a reinforced pad of an exemplary vehicle safety device in accordance with the present invention.

FIG. 6B depicts an exploded side view of a reinforced pad of an exemplary vehicle safety device in accordance with the present invention. The reinforced pad 605 is an assembly of the pad portion 606 and rigid support plate 610, as indicated by the line of explosion located centrally with respect to both the plate's connective slot 609 and the pad portion's cavity 607. The cavity 607 is hidden in this profile view, and is hence shown with dashed lines. Its diameter is substantially similar to that of the solenoid assembly (see solenoid assembly 215 of FIG. 2), which is inserted through the cavity 607 to mate with the connective slot 609 of the rigid support plate 610. The current figure shows the relative thicknesses of the frame 608 and connective slot 609, that latter of which can be double or more in thickness than the frame. The slot 609 is inserted fully into the cavity 607 so that the flat back of the pad portion 606 makes contact with the frame 608 and mated surface of the plate 610. The mating of plate 610 and pad portion 606 is accomplished via methods known in the art, in a manner that is not hindered by the thickness of the frame 608. The flat back of the pad portion 606 may have an inscribed set of corresponding tracks at a sufficient depth to accommodate the frame 608. The mated assembly results in a reinforced pad 605 that is substantially resistant to breakage and collision forces, while providing soft material properties and ergonomic design features that promote the comfort and safety of the occupant.

Figure 6C:
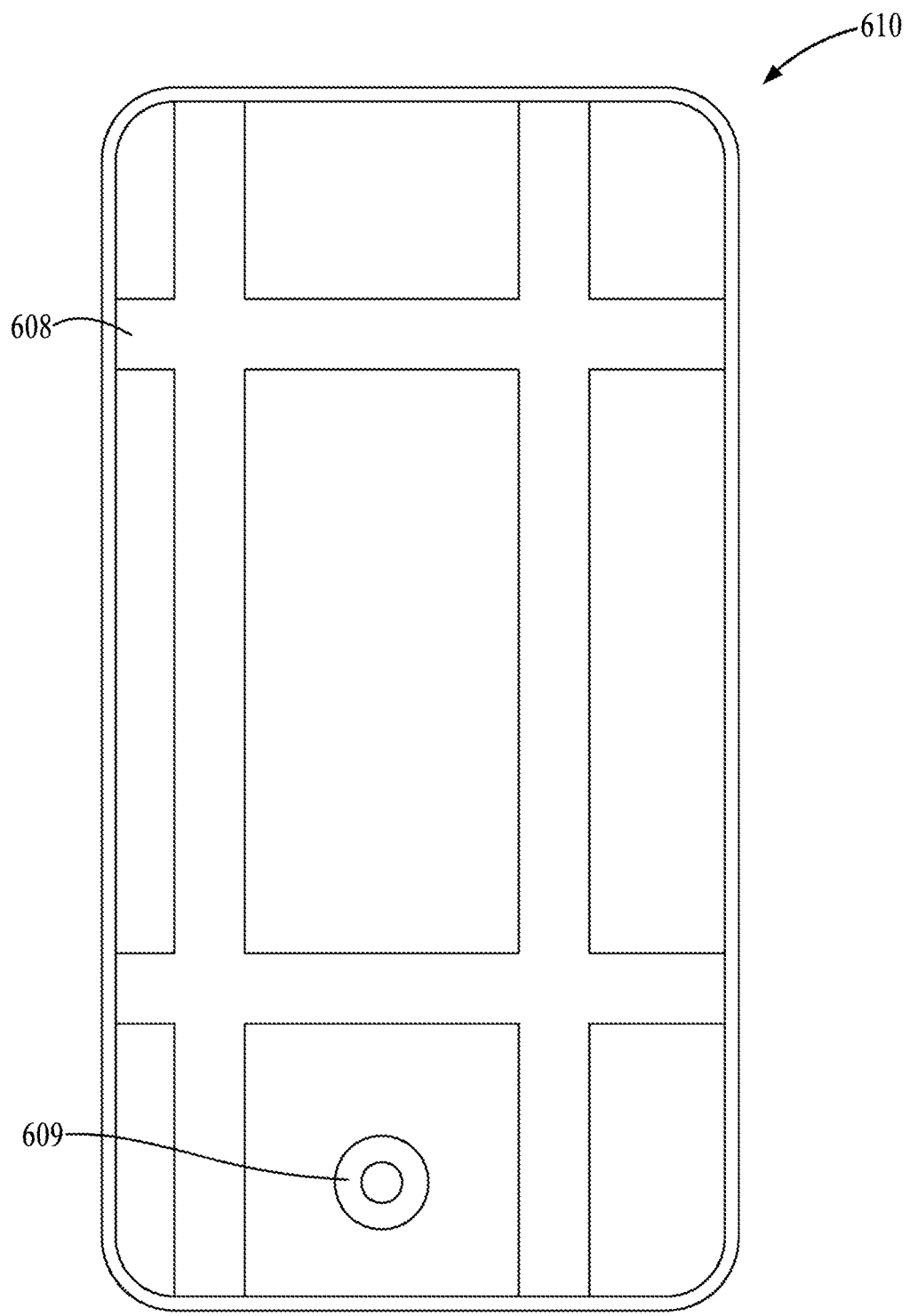
FIG. 6C depicts a front view of a rigid support plate of an exemplary vehicle safety device in accordance with the present invention.

FIG. 6C depicts an example of the front view of a rigid support plate of an exemplary vehicle safety device in accordance with the present invention. The rigid support plate 610 mostly shares the rounded contours of the attached pad (see pad portion 606 of FIGS. 6A and 6B). It is strengthened by the frame 608 running nearly entirely along its mated front surface in a pattern of two sets of two intersecting tracks, each set comprising parallel tracks and running perpendicularly to the intersecting set of tracks. The width of each track is primarily contingent upon strength/rigidity optimization, and possibly the mating technique used to combine plate 610 with the pad portion. The connective slot 609 is situated near the bottom of the mated front surface shown and is minimally offset from the lengthwise central axis of the plate 610. This placement may be based upon the optimization of pad rotation, ergonomics and safety for the occupant, and other contributing factors. In one embodiment, the rigid support plate 610 utilizes an automotive-grade plastic, and is characterized by approximate material properties as follows: a density of about 1.05e-6 kg/mm3, a Young's modulus of about 1 GPa, a yield strength of about 0.02 GPa, a Poisson's ratio of about 0.3, and a tangential modulus of about 0.01 GPa.

Figure 7A:
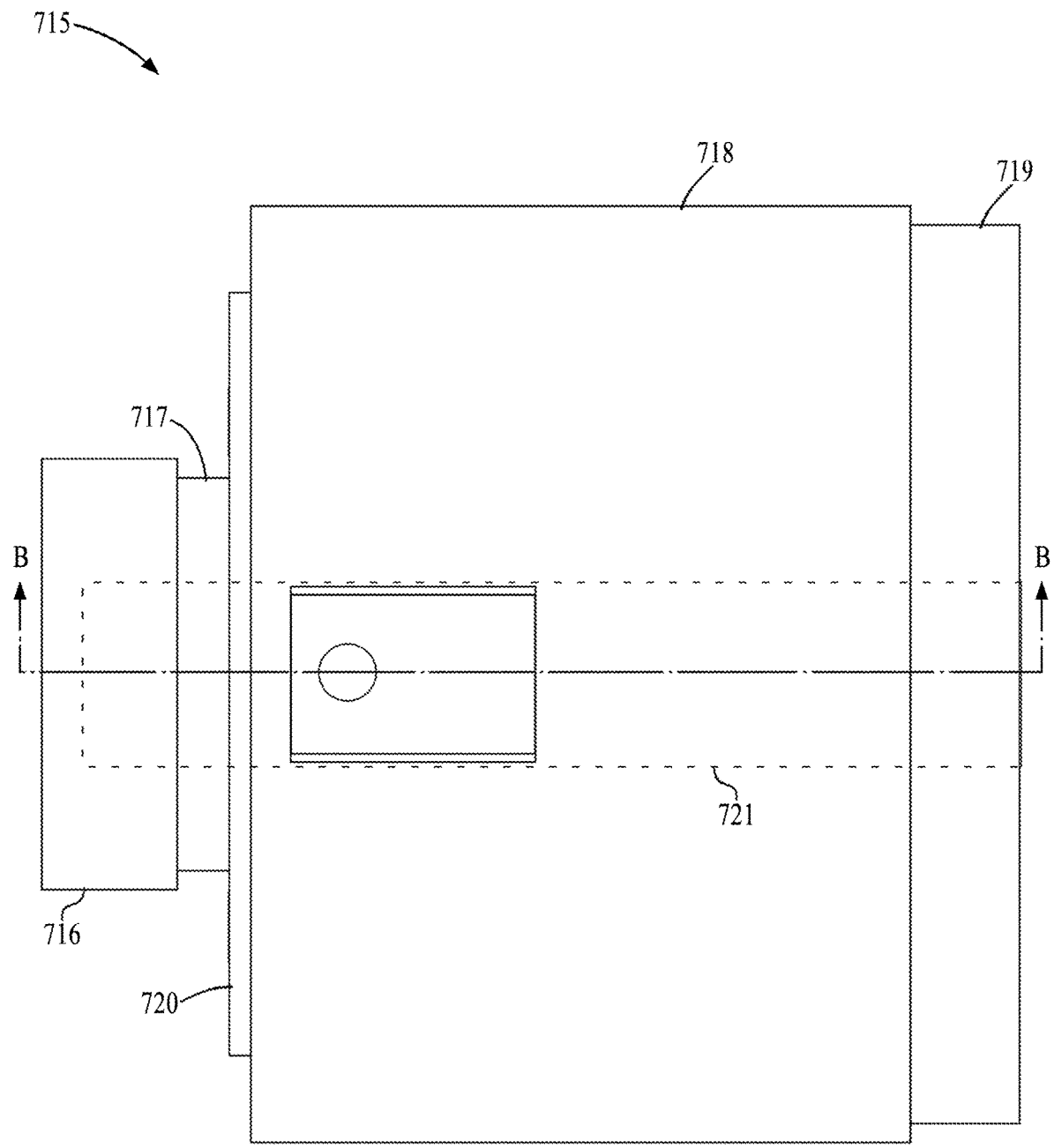
FIG. 7A depicts a top view of a solenoid assembly of an exemplary vehicle safety device in accordance with the present invention.

Referring to FIG. 7A of the drawings, a top view of a solenoid assembly of an exemplary vehicle safety device is depicted in accordance with the present invention. The solenoid assembly 715 comprises a number of cylindrical elements and bearings capable of accepting and transferring rotational motion along the length of the assembly; they are optimized to mitigate friction, thus achieving maximal rotational yield from an applied radial load. The primary component of the assembly 715 can be a conventional rotary solenoid 720 with inner shaft 721—shown with dashed lines in this view, as it is hidden within the solenoid. Solenoid operation is an on/off system that works via rotation of the centrally located shaft 721. In one embodiment, the solenoid 720 weighs approximately 600 grams, and has coil terminals with flying leads and plug. It can have a moment of inertia (or rotational mass) of approximately $4 \times 10^{-6}$ kg-m$^2$, with a time constant falling within an approximate range of about 10-30 ms. It can be available with a soft adjustable return spring, and can have an operational voltage of 205V DC, resulting from rectifying 230V AC with a bridge rectifier. Making contact with the front side (on the left, in the current view) of the solenoid 720 (around the shaft 721) is the small bearing 717, which in turn mates with the connective tube 716. The solenoid casing 718 substantially encloses the exterior of the body of the solenoid 720, as a shell structure. The casing 718 extends out a small distance perpendicularly past the back side of the solenoid 720 to provide an inner circumferential portion of contact between it and the large bearing 719. In an exemplary installation of the vehicle safety device, the solenoid assembly 715 lies substantially within a vehicle seat (see FIG. 1 as reference), however a small portion of the assembly may necessarily extend perpendicularly past the seat surface to accommodate pad rotation, seat contours (see FIG. 3A as reference), and/or seat frame size and shape (see FIG. 1 as reference). A cutting plane B-B running centrally through the solenoid assembly 715 indicates the location from which a sectional view is taken for the following figure.

Figure 7B:
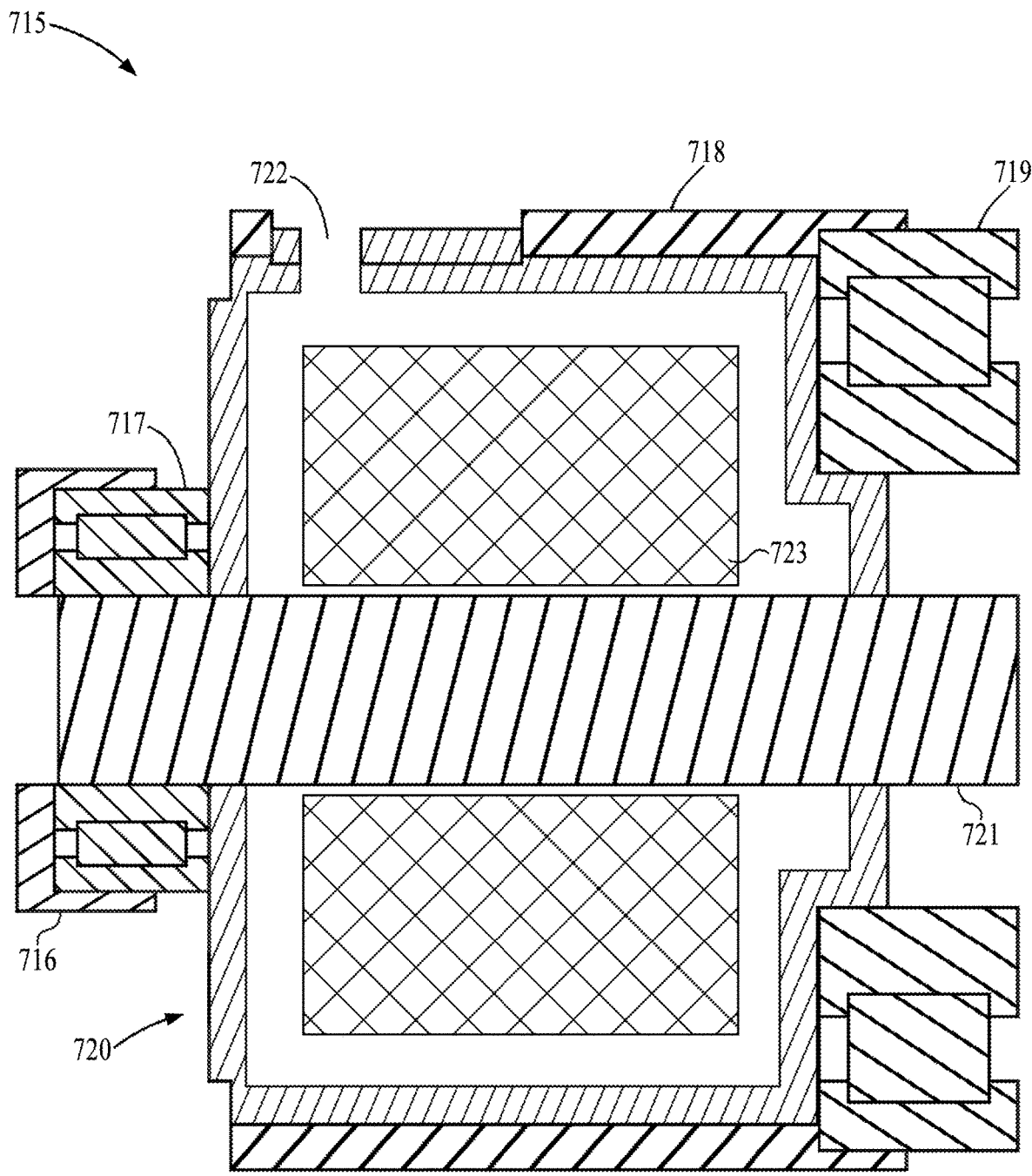
FIG. 7B depicts a sectional view of a solenoid assembly of an exemplary vehicle safety device in accordance with the present invention.

FIG. 7B depicts a sectional view of a solenoid assembly of an exemplary vehicle safety device in accordance with the present invention. Referring to SECTION B-B, the solenoid assembly 715 further comprises solenoid 720 with shaft 721, solenoid casing 718, connective tube 716, small bearing 717, and large bearing 719. The contour of the casing 718 can be seen terminating at a front surface of the front side (on the left, in this view) of the solenoid 720. Toward the opposing side of the solenoid 720, the casing 718 reduces in thickness by about half, and extends past a back surface of the back side of the solenoid in order to accommodate the large bearing 719—which is press-fit into this open area of the casing. The large bearing 719 and shaft 721 extend past the back end of the solenoid at approximately the same distance. Returning to the front end of the solenoid 720, the small bearing 717 makes contact with the solenoid's front surface, its inner surface having been press-fit around the shaft 721. The small bearing 717 and shaft 721 extend past the front side of the solenoid 720 at approximately the same distance. The connective tube 716, with small inner diameter (that of the frontal opening, left-most in this view) approximating that of both the shaft and rod's (see connective rod 214 of FIG. 2) diameter, hugs the exterior of the small bearing 717 at a second inner circumferential surface (the surface corresponding to its larger inner diameter), that surface having been press-fit onto the outer circumferential surface of the bearing. Openings at the top portions of the contours of the casing 718 and solenoid 720 indicate a wire hole 722 for the lead wiring originating from the interior of the solenoid. The crosshatched interior regions within the Solenoid 720 denote an electromagnetic coil 723. The energized coil 723 converts electromagnetic energy into mechanical energy that rotates the shaft 721.

In one embodiment, the small bearing 717 can have rings with an acetal resin (POM) composition, balls or rods made of AISI-316 stainless steel, a cage composed of PA66 Nylon, and no closures. It can have a static load rating of about 7 kgf, a dynamic load rating of about 9 kgf, and a speed limit of about 2,600 rpm. Its tolerances, including that of bore, OD, and width deviation, can be about +/−0.1 mm, +/−0.1 mm, and +/−0.5 mm, respectively. In the same embodiment, the large bearing 719 may have nearly identical compositional properties and tolerances, except with a static load rating of about 15 kgf, a dynamic load rating of about 18 kgf, and a speed limit of about 1,600 rpm. Both bearings would comply with RoHS and REACH regulations. Continuing with the above embodiment, the rod (see connective rod 214 of FIG. 2) that structurally anchors the solenoid assembly 715 to the vehicle chassis (see e.g., FIG. 1) can be characterized by approximate material properties as follows: a density of about 8e-6 kg/mm3, a Young's modulus of about 210 GPa, a yield strength of about 0.310 GPa, and a Poisson's ratio of about 0.3.

Figure 8:
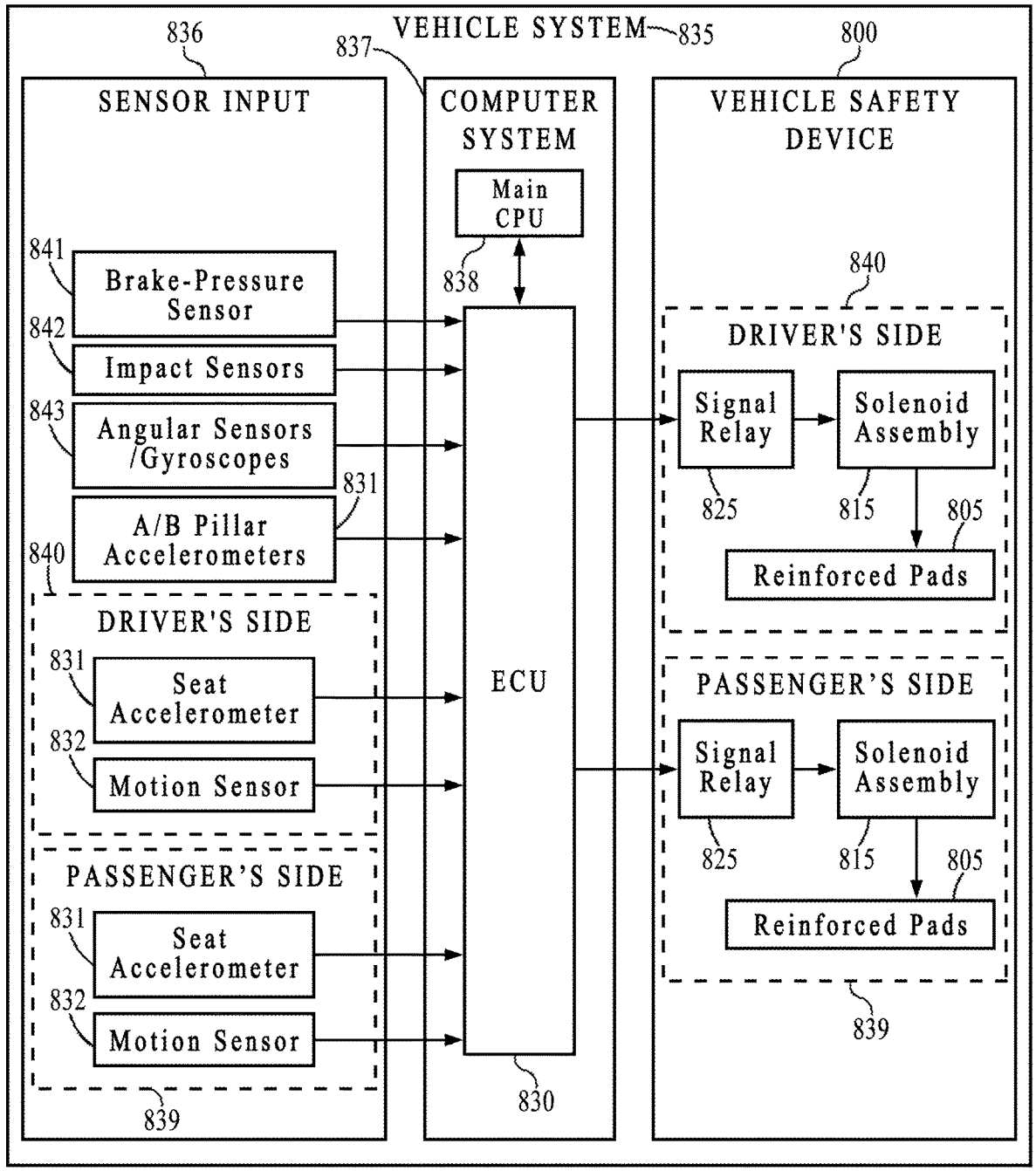
FIG. 8 depicts a diagram of the interrelated systems associated with an exemplary vehicle safety device in accordance with the present invention.

In reference to FIG. 8 of the drawings, a diagram of the interrelated systems associated with an exemplary vehicle safety device is shown in accordance with the present invention. All systems function within a vehicle system 835, which comprises sensor input 836, a computer system 837, and the vehicle safety device 800. The vehicle safety device 800 further comprises signal relay 825, solenoid assembly 815, and reinforced pads 805. The computer system 837 further comprises a main CPU 838 that bi-directionally communicates with ECU 30. In one example, ECU 30 comprises an airbag control module (ACM). In another example, ECU 30 is an ACM such that the main CPU 838 is directly in bi-directional communication with the ACM. The sensor input system 836 further comprises a brake-pressure sensor 841, safety sensors 842, angular sensors/gyroscopes 843, accelerometers 831, and side motion sensors 832. It should be noted that other sensor modules may be found in current or newer generation vehicles, and that the modules discussed herein are for illustrative purposes, and also represent certain examples that may potentially integrate well with the present invention.

A preferred embodiment is operatively associated with multiple accelerometers 831 found throughout the vehicle, including on both the A and B pillars of the vehicle. Considering the location of the vehicle safety device 800, it may be convenient to designate those accelerometers 831 found (or installed) beneath a vehicle seat as the primary sources of sensor input 836, since they can most readily be wired through the seat and integrated into the device 800 in most real-world applications. A seat accelerometer 831 paired with a side motion sensor 832 can be found (or installed) on both a driver's side 840 and passenger's side 839 of the vehicle. Another embodiment also makes use of the aforementioned brake, impact, and gyroscopic sensors 841-843 whenever possible to provide sensor input to the vehicle safety device 800. The directional arrows leading out from the various sensor modules 836 indicate the direction of sensor signal flow into the ECU 30—which processes and records these received signals as data in conjunction with the connected main CPU 838 of the vehicle system 835. Having processed this sensor data, including some which meets the threshold of activation (as programmed into the computer system 837), the ECU 30 delivers current to the signal relay(s) 825, which starts the solenoid assembly(s) 815, powering rotational activity that is transferred directly to the reinforced pads 805. In a preferred embodiment, the group of components consisting of signal relay 825, solenoid assembly 815, and reinforced pads 805, can be installed on both the driver's side 840 and passenger's side 839.

Referring to FIG. 9 (and vehicle safety device 400 of FIG. 4B), test result summary 900 shows data from an example of the vehicle safety device 400 that has been analyzed using conventional testing methods based in CAE (Computer-Aided Engineering) and FEA (Finite Element Analysis) to demonstrate consistent improvements in occupant kinematics. In one example, virtual impact testing at 20 kph shows a strong net improvement of about 18 g in head acceleration, in other words, 18 g less than that experienced without the device 400 present. Head speed and impact force are generally lessened. Similarly, lower spine acceleration improves/decreases by about 5 g, and upper spine acceleration improves/decreases by about 2 g. Conversely, pelvis acceleration increases slightly—by about 2 g. Far from adverse, this result indicates shifts in occupant momentum, between body parts, that help protect the more vital regions—i.e. the thoracic region 492 (spine) and head 491, by transferring energy to a "higher tolerance" region—i.e. the pelvic region 493. This holds especially true in more traumatic vehicular events, where not only the yaw, but the roll of a vehicle are substantially altered; it is preferred that the head 491 and thoracic 492 regions experience less lateral acceleration than the pelvic region 493 and legs 496. With regard to bodily displacement, from the same test result, a net improvement of about 3 mm is found in thorax/rib-1 displacement, where 3 mm less displacement occurs than that occurring without the device 400 present. Similarly, a net improvement of about 2 mm is found with regard to thorax/rib-2 displacement. In another similar example of virtual impact testing, this one at 35 kph, accelerations of the head and lower spine show net improvements of about 27 g and 2 g, respectively. In the same example, abdomen/rib-1, thorax/rib-1, and thorax/rib-2 displacements show net improvements of about 3 mm, 6 mm, and 6 mm, respectively. Overall, from virtual testing examples, the vehicle safety device 400 has been shown to absorb about 44 joules of otherwise internally dissipated energy in a 20 kph test. Thus, energy absorption and transference occurring via the device 400 are highly effective activities for mitigating serious injury.

While there have been described herein what are considered to be preferred and exemplary embodiments of the present invention, other modifications of the invention shall be apparent to those skilled in the art from the teachings herein. It is noted that the embodiments disclosed are illustrative rather than limiting in nature and that a wide range of variations, modifications, changes, substitutions are contemplated in the foregoing disclosure and, in some instances, some features of the present invention may be employed without a corresponding use of other features. Many such variations and modifications may be considered desirable by those skilled in the art based upon a review of the foregoing description of preferred embodiments.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A vehicle safety device, comprising:
   (a) a connective rod having a proximal end and a distal end, the proximal end configured to be fixed to the side of a vehicle seat;
   (b) a solenoid assembly connected with the distal end of the connective rod, the solenoid assembly comprising a solenoid;
   (c) a reinforced pad comprising a rigid support plate and a pad portion, the reinforced pad connected with the solenoid assembly, wherein the reinforced pad is configured to rotate about the connective rod; and
   (d) an activation assembly comprising a signal conduit, relay device, and solenoid wiring, wherein the relay device is configured to transmit an activation signal to the solenoid via the solenoid wiring, and wherein the signal conduit is in electrical communication with an electronic control unit (ECU), wherein the solenoid assembly further comprises a hollow connective tube, a small bearing, a solenoid casing, and a large bearing, wherein the connective rod extends through the hollow connective tube, small bearing and solenoid casing to connect to the solenoid wherein the small bearing is connected with a proximal end of the solenoid and the larger bearing is connected with a distal end of the solenoid.

2. The vehicle safety device of claim 1, wherein the small bearing is connected with a proximal end of the solenoid and the large bearing is connected with a distal end of the solenoid.

3. The vehicle safety device of claim 1 wherein the relay device transmits the activation signal when the relay device receives a signal corresponding to a lateral acceleration of at least about 4g.

4. The vehicle safety device of claim 1 wherein the reinforced pad is configured to rotate from an undeployed position to a deployed position once the solenoid receives the activation signal.

5. The vehicle safety device of claim 4 wherein the reinforced pad rotates up to 95 degrees from the undeployed position to the deployed position.

6. The vehicle safety device of claim 4 wherein the reinforced pad rotates at a speed in the range of about 14 to 19 meters per second.

7. The vehicle safety device of claim 4 wherein the reinforced pad rotates to the deployed position about 15 to 20 milliseconds after the relay device transmits the activation signal.

8. The vehicle safety device of claim 1 wherein the activation assembly comprises one or more sensors that are in electrical communication with the solenoid assembly and configured to transmit an activation signal to the solenoid.

9. The vehicle safety device of claim 8 wherein the one or more sensors comprise accelerometers or motion sensors.

10. The vehicle safety device of claim 9 wherein the activation signal is transmitted when the one or more sensors detect a lateral acceleration at or above a threshold level.

11. The vehicle safety device of claim 9 wherein the relay device is in electrical communication with the accelerometers or motion sensors.

* * * * *